US012771439B2

(12) United States Patent
Modasiya et al.

(10) Patent No.: US 12,771,439 B2
(45) Date of Patent: Oct. 20, 2026

(54) BEAMFORMING MUTING

(71) Applicant: T-MOBILE INNOVATIONS LLC, Overland Park, KS (US)

(72) Inventors: Krunal Mansukhlal Modasiya, Aldie, VA (US); Akin Ozozlu, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 278 days.

(21) Appl. No.: 18/404,616

(22) Filed: Jan. 4, 2024

(65) Prior Publication Data

US 2025/0226878 A1 Jul. 10, 2025

(51) Int. Cl.
*H04B 7/185* (2006.01)

(52) U.S. Cl.
CPC ..... *H04B 7/18519* (2013.01); *H04B 7/18517* (2013.01)

(58) Field of Classification Search
CPC . H04B 7/185; H04B 7/18519; H04B 7/18517
See application file for complete search history.

(56) References Cited

U.S. PATENT DOCUMENTS 9,319,172 B2 * 4/2016 Jalali .................... H01Q 13/02
9,544,862 B2 * 1/2017 Li .................... H03G 3/3073
10,004,039 B2 * 6/2018 Clausen ............ H04W 52/0238
10,117,112 B2 * 10/2018 Reis .................... H04L 63/107
10,165,452 B2 * 12/2018 Ramamurthi ......... H04W 16/28
10,432,280 B1 * 10/2019 Mansour .............. H04B 7/0874
11,791,873 B1 * 10/2023 Chopra ............... H04B 7/0456 375/267
2013/0182790 A1 * 7/2013 Jalali .................... H04L 1/0009 375/285
2014/0003270 A1 * 1/2014 Maltsev ............... H04W 52/34 370/252
2015/0126236 A1 * 5/2015 Mukherjee ........... H04L 5/0032 455/522
2015/0156724 A1 * 6/2015 Clausen .............. H04W 52/244 370/252

(Continued)

OTHER PUBLICATIONS

International Search Report and Written Opinion received for PCT Patent Application No. PCT/US2025/010187, mailed on Nov. 24, 2025, 13 pages.

*Primary Examiner* — Hai V Nguyen
(74) *Attorney, Agent, or Firm* — SHOOK, HARDY & BACON L.L.P.

(57) ABSTRACT

The technology disclosed herein relates to beamforming muting. In embodiments, methods, systems, and computer storage media can transmit, via at least one antenna array using a listening mode for interference detection, a plurality of signals along a plurality of vectors of a coverage area. For example, the plurality of signals may be transmitted via an azimuth sweep from −90 to +90 degrees. Based on transmitting the plurality of signals, an interference above a predetermined threshold can be detected, the interference corresponding to a satellite earth station. Based on the interference, at least one beam of the antenna array can be identified for muting (e.g., based on a determined angle of arrival associated with the interference, based on the plurality of vectors used for the interference detection, based on an azimuth corresponding to the interference, etc.).

18 Claims, 4 Drawing Sheets

(56) References Cited

U.S. PATENT DOCUMENTS

| | | | | |
|---|---|---|---|---|
| 2015/0208371 | A1* | 7/2015 | Yie | H04W 56/002 370/328 |
| 2016/0119886 | A1* | 4/2016 | Li | H04W 52/52 375/345 |
| 2017/0093038 | A1* | 3/2017 | Li | H01Q 1/246 |
| 2017/0171868 | A1* | 6/2017 | Reis | H04W 16/28 |
| 2017/0289917 | A1* | 10/2017 | Visotsky | H04W 72/52 |
| 2017/0318491 | A1* | 11/2017 | Chen | H04B 7/0617 |
| 2018/0103381 | A1* | 4/2018 | Ramamurthi | H04W 36/0016 |
| 2019/0013883 | A1* | 1/2019 | Tercero Vargas | H04B 7/0413 |
| 2019/0124639 | A1* | 4/2019 | Nilsson | H04W 72/046 |
| 2019/0191346 | A1* | 6/2019 | Han | H04B 7/024 |
| 2019/0349074 | A1* | 11/2019 | Petranovich | H04B 7/19 |
| 2021/0204270 | A1* | 7/2021 | Li | H04B 7/06952 |
| 2021/0289476 | A1* | 9/2021 | Ryu | H04B 7/0404 |
| 2022/0116886 | A1* | 4/2022 | Manolakos | G01S 7/003 |
| 2022/0225186 | A1* | 7/2022 | Landis | H04B 17/328 |
| 2022/0248340 | A1* | 8/2022 | Miyatake | H04W 16/28 |
| 2023/0362703 | A1* | 11/2023 | Zhang | H04W 24/10 |
| 2024/0187077 | A1* | 6/2024 | Karjalainen | H04B 7/06952 |
| 2024/0340079 | A1* | 10/2024 | Yin | H04B 7/0695 |
| 2025/0030462 | A1* | 1/2025 | Zhang | H04B 7/0452 |
| 2025/0211323 | A1* | 6/2025 | Whitefield | H04B 7/18513 |
| 2025/0310791 | A1* | 10/2025 | Modasiya | H04W 16/28 |

* cited by examiner

BEAMFORMING MUTING

SUMMARY

A high-level overview of various aspects of the invention are provided here to offer an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

According to various aspects of the technology disclosed herein, beamforming muting can implemented (e.g., at one or more antenna arrays of a base station). For example, one or more antennas of a base station can transmit a plurality of signals along a plurality of vectors of a coverage area such that the at least one antenna array is in a listening mode for interference detection. Based on transmitting the plurality of signals along the plurality of vectors, an interference above a predetermined threshold can be detected, the interference corresponding to a satellite earth station. Based on the interference, at least one beam for at least one antenna array can be identified for muting (e.g., based on a determined angle of arrival associated with the interference, based on the plurality of vectors used for the interference detection, based on an azimuth corresponding to the interference, etc.).

In some embodiments, the listening mode can be implemented during a special subframe time period. In some embodiments, the listening mode can be implemented without utilizing a guard period, such that transitions from receiving mode and transmission mode occur without delay. In some embodiments, the plurality of signals are transmitted via an azimuth sweep from −90 to +90 degrees. In some embodiments, the plurality of signals include one or more of synchronization signals and cell-specific reference signals. In some embodiments, the interference corresponds to an aviation surveillance frequency.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
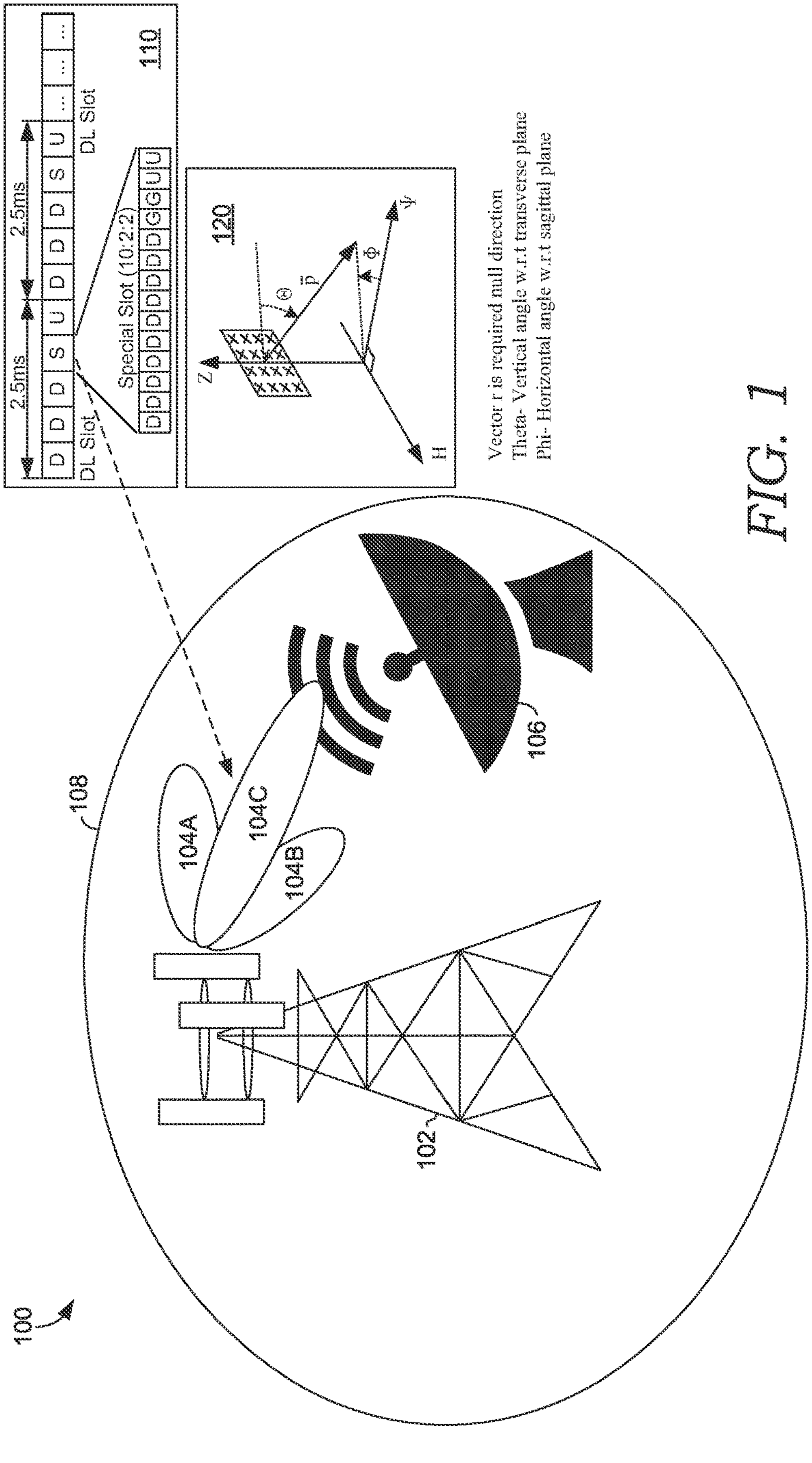
FIG. 1 depicts an example operating environment for beamforming muting, in accordance with embodiments herein.

The subject matter of the present invention is being described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of systems and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the aspects set forth herein.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term a "communication service" provided by a base station or access point may be synonymous with network access technology (NAT), a communication protocol and umbrella term used to refer to the particular technological standard/protocol that governs a communication associated with user equipment (UE). Examples may include 3G, 4G, 5G, 6G, another generation technology, 802.11x, etc., or one or more combinations thereof. The term "access point" is used to refer to an access point that transmits signals to a UE and receives signals from the UE in order to allow the UE to connect to a broader data or cellular network (including by way of one or more intermediary networks, gateways, or the like).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

By way of background, base stations and satellite earth station have caused interferences with each other (e.g., based on operating in same C-band frequency range). These interferences have caused issues with communication services (e.g., communication services for user equipment (UEs)). Currently, base stations do not have smart sensing mechanisms to identify characteristics of interfering signals from satellite earth stations (e.g., an angle of arrival from the interfering frequency or frequencies). Because of the lack of these smart sensing mechanisms, base stations and satellite earth stations continue to introduce interferences for each other, and user devices have received issues with utilizing communication services as a result. As another example, the interferences caused by the base station can also cause interferences with communication services associated with airplanes, drones, satellites, etc.

Embodiments of the technology discussed herein provide various improvements to the prior technologies discussed above. For example, the presently disclosed technology can nullify or mute one or more beams in a direction corresponding to particular transmissions from a satellite earth station. For instance, one or more particular beamforming transmissions can be muted so that communications are not thwarted. As another example, presently disclosed technology can mitigate interferences between satellite earth stations and other access points, which fosters efficient and safe communications (e.g., without interferences for UE communications, airplane communications, satellite communications, drone communications, etc.). Accordingly, the presently disclosed technology related to beamforming muting discussed herein provides various technological improvements that enhance network access technology communication protocols.

Example Operating Environments

Turning now to FIG. 1, example operating environment 100 is illustrated in accordance with one or more embodiments disclosed herein. At a high level, the example operating environment 100 comprises base station 102, beams 104A and 104B, interfering beam 104C, satellite earth station 106, frame structure 110, and vector plot 120. The base station 102 provides coverage area 108, wherein portions of the coverage area 108 can provide communication services via beams 104A, 104B, and interfering beam 104C.

Example operating environment 100 is but one example of a suitable environment for the technology and techniques disclosed herein, and is not intended to suggest any limitation as to the scope of use or functionality of the invention. Neither should the environment 100 be interpreted as having any dependency or requirement relating to any one or combination of components illustrated. For example, other embodiments of example operating environment 100 may have additional base stations or satellite earth stations. As another example, even though the base station 102 is illustrated in example operating environment 100 as a macro base station, the base station 102 may also be another type of base station (e.g., a small cell, femtocell, relay base station, another type of network access technology access point, or one or more combinations thereof).

In embodiments, the base station 102 can be referred to as one or more cell sites, nodes, gateways, remote radio unit control components, base transceiver stations, access points, NodeBs, eNBs, gNBs, Home NodeBs, Home eNodeBs, macro base stations, small cells, femtocells, relay base stations, another type of base station, or one or more combinations thereof. Base station 102 can include a single physical transmission and reception points or multiple physical transmission and reception points (e.g., in which one or more of the multiple physical transmission and reception points are co-located, in which one or more of the multiple physical transmission and reception points are not co-located). For example, in some embodiments, the single physical transmission and reception points may be an antenna of the base station 102 corresponding to a cell of the base station 102. In other embodiments, the base station 102 may have one or more antenna arrays (e.g., a multiple-input multiple-output (MIMO) system, for beamforming, etc.). In embodiments wherein the base station 102 has multiple non-co-located physical transmission and reception points, the physical transmission and reception points may be a distributed antenna system (e.g., spatially separated antennas connected to a common source via a transport medium), a remote radio head (e.g., a remote base station connected to a serving base station), etc.

Base station 102 can transmit beams 104A, 104B, and interfering beam 104C for providing one or more communication services within the coverage area 108. In some embodiments, one or more of beams 104A, 104B, and interfering beam 104C may correspond to one or more links between the base station 102 and the satellite earth station 106 or between the base station 102 and one or more UEs. In some embodiments, one or more communication services within the coverage area 108 may include uplink transmissions (e.g., from a UE or the satellite earth station 106 to the base station 102), downlink transmissions (e.g., from the base station 102 to a UE or the satellite earth station 106), or one or more combinations thereof. In some embodiments, the one or more communication services provided by base station 102 (e.g., via one or more of beams 104A, 104B, and interfering beam 104C) within the coverage area 108 may include an Internet browsing service, a Wi-Fi messaging service, Voice over IP, gaming, High Frequency Trading, a message service, SMS messages, MMS messages, an emergency medical service, another type of communication service, or one or more combinations thereof.

In some embodiments, one or more of beams 104A, 104B, and interfering beam 104C may be transmitted using MIMO antenna technology, including spatial multiplexing, beamforming, transmit diversity, another type of MIMO antenna technique, or one or more combinations thereof. In embodiments, one or more of the beams 104A, 104B, and interfering beam 104C may correspond to one or more carrier frequencies. In some embodiments, more or less carrier frequencies may be allocated for downlink than for uplink transmissions via one or more of beams 104A, 104B, and interfering beam 104C. In some embodiments, beamforming weights for transmitting one or more of the beams 104A, 104B, and interfering beam 104C may be based on discrete Fourier transform (DFT) vectors for a particular beam width and for a particular array gain.

In embodiments, antenna elements (e.g., antenna elements of one or more antenna arrays corresponding to the base station 102) can transmit a plurality of signals (e.g., synchronization signals, cell-specific reference signals, etc., or one or more combinations thereof) along a plurality of vectors (e.g., including the vector within vector plot 120) of the coverage area 108, such that the base station 102 (or a portion thereof) is in a listening mode for interference detection (e.g., for detecting interfering beam 104C with the satellite earth station 106). In some embodiments, the base station 102 transmits the plurality of signals for uplink sub-frames (e.g., the uplink slots within frame structure 110), downlink sub-frames (e.g., the downlink slots within frame structure 110), or both downlink sub-frames and uplink sub-frames. In some embodiments, the base station 102 transmits the plurality of signals in receive-mode, transmission-mode, or one or more combinations thereof. By transmitting the plurality of signals along the plurality of vectors of the coverage area 108, such that the base station 102 (or a portion thereof) is in the listening mode for interference detection, the base station 102 can learn uplink transmission patterns for mapping and understanding various characteristics of the uplink transmissions.

In some embodiments, the base station 102 is in the listening mode to detect transmission by the satellite earth station 106 during one or more special sub-frame time periods. In embodiments, the listening mode may correspond to a 10 millisecond radio frame that includes downlink sub-frame, uplink sub-frame and special sub-frame (e.g., the slots within frame structure 110). For instance, at least one antenna array of the base station 102 may be in listening mode for a special sub-frame time period. In some embodiments, the base station 102 may be in listening mode (e.g., during the full period of the listening mode) without utilizing a guard period (e.g., when switching from uplink sub-frame to downlink sub-frame), such that transitions from receiving mode and transmission mode occur without delay. In some embodiments, the plurality of signals are transmitted via an azimuth sweep from −90 to +90 degrees (e.g., during an entire special sub-frame), such that there is a 180 degree angle of arrival sweep from the bore site of the base station 102. For example, a plurality of antenna elements of one or more antenna arrays of the base station 102 can transmit the plurality of signals for an azimuth sweep from −90 to +90 degrees. In some embodiments, the one or more antenna arrays may include a directional sweeping transmit antenna array.

In some embodiments, the plurality of signals (e.g., synchronization signals, reference signals, beam selection signals, other control signals, etc.) may be transmitted by the base station 102 multiple times in different directions along the plurality of vectors within coverage area 108. In some embodiments, the base station 102 may transmit one or more of the plurality of signals according to different weight sets associated with particular vectors of the plurality of vectors. The transmissions of the plurality of signals along the plurality of vectors may be used to identify (e.g., by a transmitting device, such as a base station 102, or by a receiving device, such as a UE or the satellite earth station) one or more particular vectors for later transmission or reception by the base station 102. In some embodiments, the plurality of signals transmitted along the plurality of vectors for interference determinations can include one or more synchronization signal blocks that are broadcast by particular antenna elements of the base station 102. For example, one or more antenna arrays within the coverage area 108 may broadcast synchronization signal blocks over a single frequency network in an omni-directional broadcast, in a directional broadcast, etc., or one or more combinations thereof.

In embodiments, based on transmitting the plurality of signals, an interference (e.g., noise) that is above a predetermined threshold can be detected (e.g., by the base station 102). In embodiments, the interference detected corresponds to the satellite earth station 106. For example, the satellite earth station 106 may be a fixed satellite earth station (e.g., having a fixed location) or a mobile satellite earth station (e.g., installed on a terrestrial vehicle, ship, drone, another type of vehicle, etc., or one or more combinations thereof). In some embodiments, the satellite earth station 106 is a gateway node, such as a satellite dish. In some embodiments, the satellite earth station 106 can connect one or more satellites, airplanes, drones, etc., to a terrestrial network (e.g., a 5G network, 6G network, another generation network, etc.). As another example, the satellite earth station 106 may connect one or more satellites, airplanes, drones, etc., via a feeder link.

In some embodiments, the interference corresponds to an aviation surveillance frequency (e.g., 2700-2900 MHz associated with operating various types of radar systems that perform missions critical to safe and reliable air traffic control or weather monitoring). In some embodiments, the base station 102 can detect interference from one or more airport surveillance radar systems, one or more meteorological radar systems, etc., or one or more combinations thereof. In some embodiments, the interference corresponds to a C-band frequency (e.g., 4-6 GHz) that both the base station 102 and the satellite earth station 106 are using.

In some embodiments, the interference is detected based on peak energy associated with the base station 102 (or particular antenna elements thereof) and load. Stated differently, the interference may be detected within the coverage area 108 (e.g., via one or more of the signals transmitted along the plurality of vectors) based on peak energy during peak loads (e.g., corresponding to UEs within the coverage area 108). By way of example, the threshold for detecting interference may be a peak energy level threshold (e.g., 3 dB, 3 dB on top of the thermal noise floor, a particular percentage of the peak energy level, etc.). To illustrate, the peak energy level may be associated with a particular time during a particular day. In some implementations, the interference threshold may be dynamically adjusted based on non-peak energy levels. Additionally or alternatively, in some embodiments, the interference is detected based on Reference Signal Received Power (RSRP) measurements that are below a threshold (e.g., one or more UEs detecting RSRP signals from the base station 102 that are below a threshold).

Based on detecting an interference (e.g., associated with satellite earth station 106) is above a predetermined threshold, in some embodiments, the angle of arrival (e.g., associated with interference(s) from the satellite earth station 106) can be determined. For instance, the angle of arrival from an interfering beam from the satellite earth station 106 to the base station 102 can be determined using discrete Fourier transform direction-of-arrival estimation. In some embodiments, discrete Fourier transform estimations of the angle of arrival can be determined using a number of antennas or antenna elements of the base station 102 (e.g., the number in which are transmitting the azimuth sweep for interference detection during the listening mode). In some embodiments, the angle of arrival can be determined based on using a normalized discrete Fourier transform matrix of the uplink transmissions detected during the listening mode. In some embodiments, one or more detected angles of arrival from interfering beams from the satellite earth station 106 may correspond to multi-path beams from the satellite earth station 106 that are Line Of Sight with base station 102 antenna elements.

In some embodiments, the plurality of signals (e.g., synchronization signals) may be transmitted by the base station 102 along different angles of departure and along particular vectors, such that one or more angles of arrival can be determined for one or more interfering beams transmitted by the satellite earth station 106, and a Synchronization Signal Block index may be used to identify which beam(s) of the base station 102 (e.g., interfering beam 104C) is interfering with beam(s) transmitted by the satellite earth station 106. In embodiments, one or more beamforming beams of the base station 102 (e.g., interfering beam 104C) can be muted based on one or more vectors in which the plurality of signals were transmitted, based on the angle of arrival (e.g., azimuth angle of arrival) of one or more transmissions from the satellite earth station 106, based on an azimuth domain beam width of a transmission from the satellite earth station 106, or one or more combinations thereof. For example, the interfering beam 104C which is muted can be n41 (2500 MHz), 2.5 GHz 5G band, etc., and the UEs previously utilizing communication services from that beam could be handed off to another frequency band provided by the base station 102 (e.g., N71, N45, N25, N66).

Figure 2:
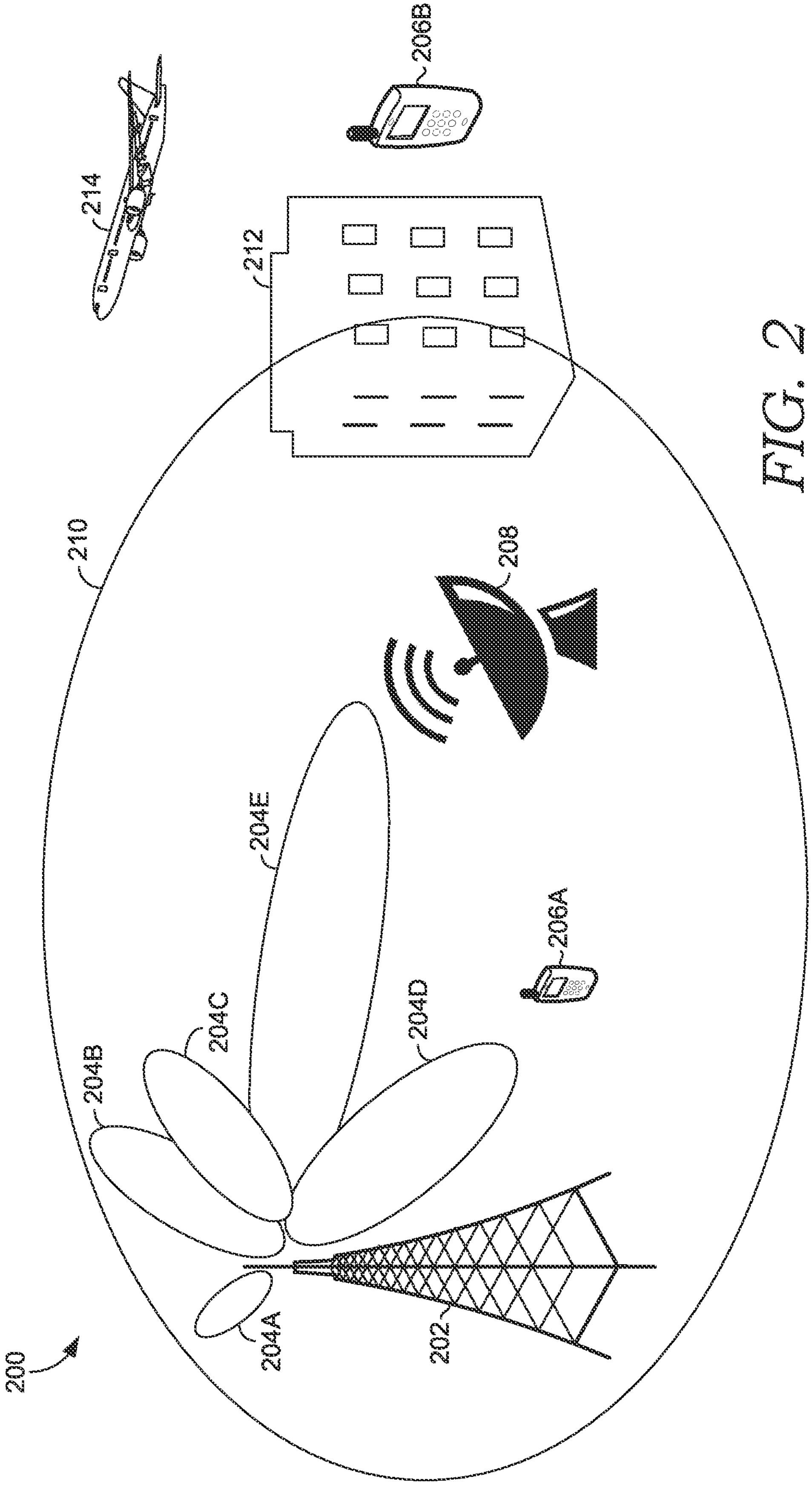
FIG. 2 depicts an example operating environment for beamforming muting, in accordance with embodiments herein.

FIG. 2 of example operating environment 200 includes base station 202, beams 204A-204D, interfering beam 204E, UEs 206A and 206B, satellite earth station 208, coverage area 210 provided by the base station 202, building 212, and airplane 214.

Example operating environment 200 is but one example of a suitable environment for the technology and techniques disclosed herein, and is not intended to suggest any limitation as to the scope of use or functionality of the invention. Neither should the environment 200 be interpreted as having any dependency or requirement relating to any one or combination of components illustrated. For example, another embodiment of satellite earth station 208 may include the Five-hundred-meter Aperture Spherical Telescope's (FAST) giant dish. As another example, even though the UEs 206A and 206B are illustrated in example operating environment 200 as mobile devices, UEs may take on other embodiments (e.g., a router, tablet computer, laptop computer, consumer asset locating device, wearable device (e.g., smartwatch, glasses, augmented reality headset, virtual reality headset, extended reality headset, etc.), vehicle (e.g., automobile, motorcycle, bicycle, ship, drone, etc.), a wireless local loop station, an internet of things device, an Internet of Everything device, a machine type communication device, an evolved or enhanced machine type communication device, etc., or one or more combinations thereof).

In embodiments, base station 202 can transmit, during a listening mode, a plurality of signals along a plurality of vectors (e.g., vectors corresponding to each of the beams 204A-204D, interfering beam 204E) of the coverage area 210 for interference detection. In embodiments, the interference being detected during listening mode may correspond to communications from the satellite earth station 208 to the airplane 214 (e.g., an aviation surveillance frequency, such as 14.0-14.5 GHz Earth-to-space or uplink frequency bands). Based on the interference detection (e.g., noise) during listening mode, an angle of arrival associated with the satellite earth station interference can be determined for identifying that the interfering beam 204A is to be muted. For example, upon the base station muting the interfering beam 204E, UE 206A can continue to utilize the beam 204D and the UE 206B (e.g., within the building 212) may be handed off to another frequency band provided by the base station 202 (e.g., N71, N45, N25, N66) or provided by another base station.

Example Flowchart

Figure 3:
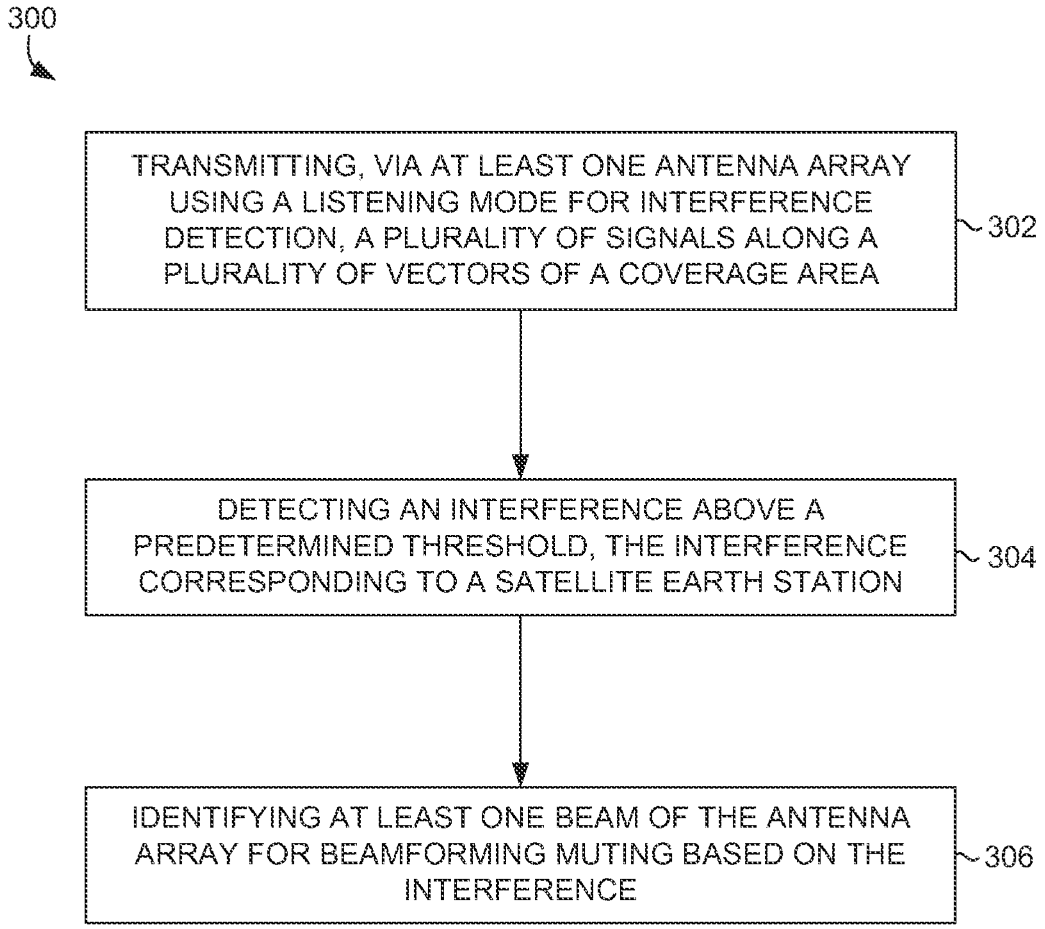
FIG. 3 illustrates an example flowchart for beamforming muting, in accordance with aspects herein.

Having described the example embodiments discussed above, an example flowchart is described below with respect to FIG. 3. Example flowchart 300 begins at step 302 with transmitting, via a plurality of antenna elements or at least one antenna array, a plurality of signals (e.g., synchronization signals) along a plurality of vectors of a coverage area such that the at least one antenna array is in a listening mode for interference detection. In some embodiments, the plurality of signals are transmitted via an azimuth sweep from −90 to +90 degrees. For example, the plurality of signals can be transmitted via a 180 degree angle of arrival sweep from the bore site. In some embodiments, the plurality of signals may be transmitted via a directional sweeping transmit antenna array.

In some embodiments, particular antenna elements or at least one antenna array, transmitting the plurality of signals, is in a listening mode for a special subframe time period. In some embodiments, the particular antenna elements or at least one antenna array are in a listening mode without utilizing a guard period, such that transitions from the base station receiving mode and transmission mode occur without delay. In some embodiments, the particular antenna elements or at least one antenna array are in a listening mode during a peak energy time frame. In some embodiments, the particular antenna elements or at least one antenna array are in a listening mode for a ten millisecond radio frame for each of a downlink subframe, special subframe, and uplink subframe.

At step 304, based on transmitting the plurality of signals, an interference above a predetermined threshold can be detected. For example, in some embodiments, the interference may be detected by a base station and the interference may correspond to a beam being transmitted by a satellite earth station. In other embodiments, the interference may be detected by a satellite earth station and the interference may correspond to a beam being transmitted by a base station. In some embodiments, the base station or satellite earth station may utilize server(s), UEs, terrestrial vehicles, non-terrestrial vehicles, satellites, etc., for detecting an angle of arrival (e.g., at the base station) via the interfering beam. In this way, for example, determinations made based on the detected interference can be used for muting at least one beam at step 306.

For example, some embodiments may include muting at least one beam (e.g., muting a beamforming beam of a base station) based on identifying a vector, associated with the signals (e.g., synchronization signals) being transmitted along particular vectors by the base station in listening mode. For instance, the vector identified for muting could be identified based on determining that that vector of the plurality of vectors (e.g., along 180 degrees of the coverage area from the bore) corresponds to the detected interference. In another embodiment, one or more beams transmitted by the satellite earth station could be muted based on the satellite earth station detecting a particular interference from the base station.

In some embodiments, the muting of the particular beam can be performed based on using an angle of arrival associated with the interference (e.g., the interference being from the satellite earth station). For instance, the angle of arrival (e.g., an azimuth angle of arrival associated with the interference corresponding to the satellite earth station) can be determined to identify the particular vector, which corresponds to the beam to be muted. In some embodiments, the vector used for muting the particular beam can be determined using an azimuth domain beam width (e.g., of the interfering beam from the satellite earth station causing interference with a base station transmission).

In embodiments, the angle of arrival from an interfering beam from the satellite earth station to the base station can be determined using discrete Fourier transform angle of arrival estimation (e.g., using a normalized discrete Fourier transform matrix of the uplink transmissions from the satellite earth station detected during the listening mode). In some embodiments, discrete Fourier transform estimations of the angle of arrival of the interfering satellite earth beam can be determined based on applying one or more filters (e.g., band-pass filter, moving average filter, etc.). In this way, one or more particular beams transmitted by the base station (e.g., n41 (2500 MHz), 2.5 GHz 5G band, etc.) could be muted based on the angle of arrival determined for the interfering satellite earth station beam. In some embodiments, the angle of arrival is determined using two or more of the plurality of vectors in which the signals are transmitted during listening mode.

Example UE

Figure 4:
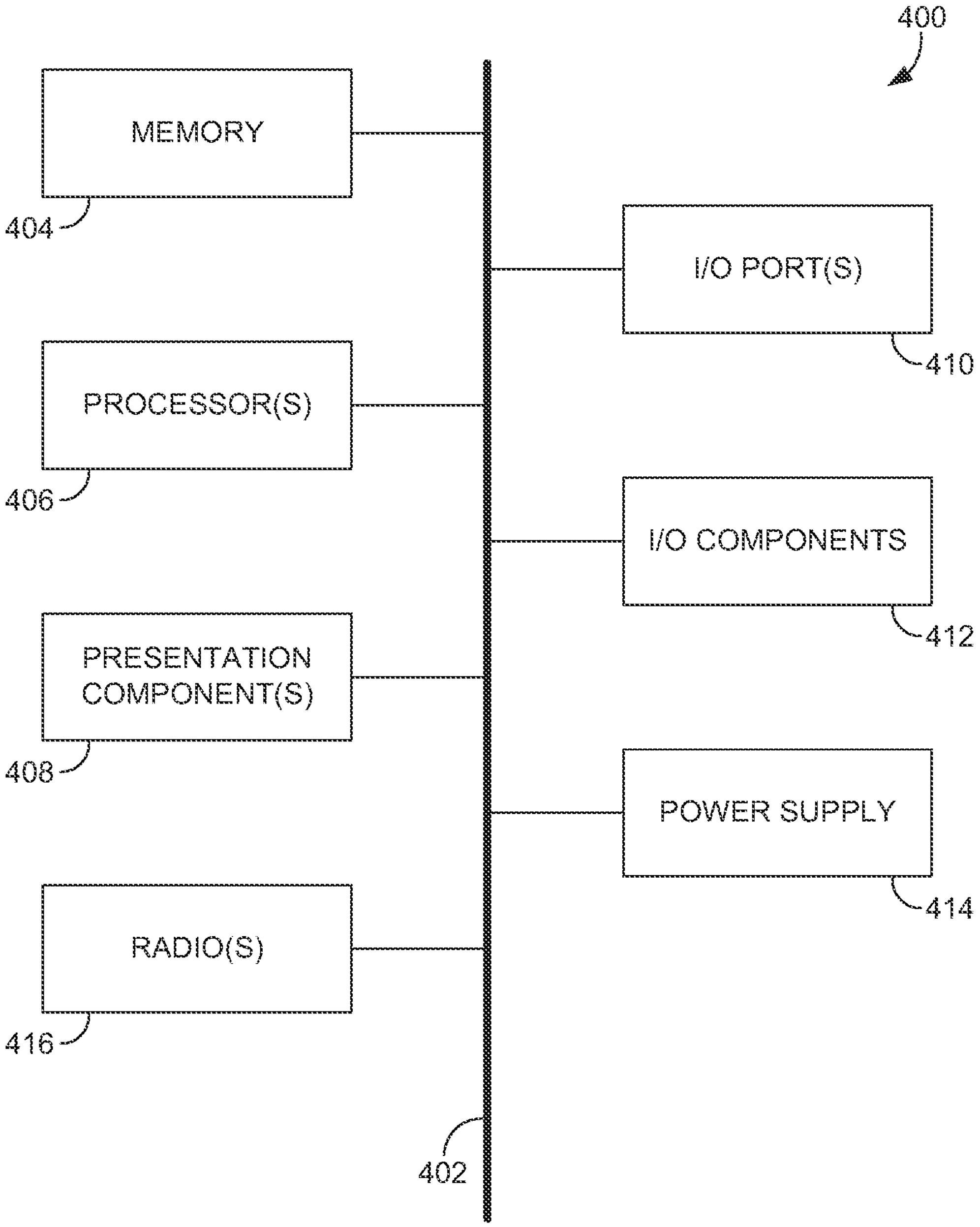
FIG. 4 depicts an example user device suitable for use in implementations of the present disclosure, in accordance with aspects herein.

Referring now to FIG. 4, a diagram is depicted of an exemplary computing environment suitable for use in implementations of the present disclosure. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 4, computing device 400 includes bus 402 that directly or indirectly couples the following devices: memory 404, one or more processors 406, one or more presentation components 408, input/output (I/O) ports 410, I/O components 412, power supply 414 and radio(s) 419. Bus 402 represents what may be one or more busses (such as an address bus, data bus, or combination thereof). Although the devices of FIG. 4 are shown with lines for the sake of clarity, in reality, delineating various components is not so clear, and metaphorically, the lines would more accurately be grey and fuzzy. For example, one may consider a presentation component, such as a display device to be one of I/O components 412. Also, processors, such as one or more processors 406, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 4 and refer to "computer" or "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

Memory 404 includes computer-storage media in the form of volatile and/or nonvolatile memory. Memory 404 may be removable, non-removable, or a combination thereof. Exemplary memory includes solid-state memory, hard drives, optical-disc drives, etc. Computing device 400 includes one or more processors 406 that read data from various entities, such as bus 402, memory 404, or I/O components 412. One or more presentation components 408 presents data indications to a person or other device. Exemplary one or more presentation components 408 include a display device, speaker, printing component, vibrating component, etc. I/O ports 410 allow computing device 400 to be logically coupled to other devices, including I/O components 412, some of which may be built in computing device 400. Illustrative I/O components 412 include a microphone, joystick, game pad, satellite dish, scanner, printer, wireless device, etc.

Radio 419 represents a radio that facilitates communication with a wireless telecommunications network. Illustrative wireless telecommunications technologies include CDMA, GPRS, TDMA, GSM, and the like. Radio 419 might additionally or alternatively facilitate other types of wireless communications including Wi-Fi, WiMAX, LTE, or other VoIP communications. As can be appreciated, in various embodiments, radio 419 can be configured to support multiple technologies and/or multiple radios can be utilized to support multiple technologies. A wireless telecommunications network might include an array of devices, which are not shown so as to not obscure more relevant aspects of the invention. Components, such as a base station, a communications tower, or even access points (as well as other components), can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In the preceding Detailed Description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

In addition, in the preceding Detailed Description, words such as “a” and “an,” unless otherwise indicated to the contrary, may also include the plural as well as the singular. Thus, for example, the constraint of “a feature” is satisfied where one or more features are present. Furthermore, the term “of” includes the conjunctive, the disjunctive, and both (a or b thus includes either a or b, as well as a and b). Further, the term “some” may refer to “one or more.” Additionally, an element in the singular may refer to “one or more.” The term “plurality” may refer to “more than one.”

In the preceding Detailed Description, “computer storage media” does not comprise signals per se.

The invention claimed is:

1. A system for beamforming muting, the system comprising:
- at least one antenna array of a terrestrial base station;
- one or more processors corresponding to the at least one antenna array; and
- computer memory storing computer-usable instructions that, when executed by the one or more processors, cause the one or more processors to perform operations comprising:
- transmitting, via the at least one antenna array during a listening mode, a plurality of signals along a plurality of beams of a coverage area;
- detecting based on one or more user equipment (UE) observations of noise with respect to the plurality of signals, an interference above a predetermined threshold, the interference corresponding to a satellite earth station;
- determining an angle of arrival corresponding to the satellite earth station based on the detected interference; and
- muting a beam of the at least one antenna array that corresponds to the angle of arrival.

2. The system according to claim 1, wherein the plurality of signals are synchronization signals.

3. The system according to claim 1, wherein the at least one vector is determined using an azimuth angle of arrival associated with the interference corresponding to the satellite earth station.

4. The system according to claim 1, wherein the at least one vector is determined using an azimuth domain beam width associated with the interference corresponding to the satellite earth station.

5. The system according to claim 1, wherein the at least one antenna array is in the listening mode for a special subframe time period.

6. The system according to claim 1, wherein the at least one antenna array is in the listening mode without utilizing a guard period, such that transitions from receiving mode and transmission mode occur without delay.

7. The system according to claim 1, wherein the plurality of signals are transmitted via an azimuth sweep from −90 to +90 degrees, and wherein the at least one beam is muted based on an angle of arrival and a peak energy detected during the azimuth sweep, the angle of arrival and the peak energy corresponding to the interference.

8. The system according to claim 1, wherein the interference corresponds to an aviation surveillance frequency.

9. The system according to claim 1, wherein the angle of arrival is determined using discrete Fourier transform direction-of-arrival estimation based on a normalized discrete Fourier transform matrix of uplink transmissions detected during the listening mode, and wherein one or more UEs previously utilizing communication services from the muted beam are handed off to another frequency band provided by the terrestrial base station.

10. A method for beamforming muting, the method comprising:
- transmitting, during a listening mode, a plurality of signals along a plurality of beams of a coverage area;
- detecting based on one or more user equipment (UE) observations of noise with respect to the plurality of signals, an interference above a predetermined threshold, the interference corresponding to a satellite earth station;
- determining an angle of arrival corresponding to the satellite earth station based on the detected interference; and
- muting beamforming by at least one antenna array of a terrestrial base station for a beam that corresponds to the angle of arrival.

11. The method according to claim 10, wherein the angle of arrival is determined using at least two of the plurality of vectors.

12. The method according to claim 11, wherein the plurality of signals are transmitted via an azimuth sweep from −90 to +90 degrees, and wherein the beamforming is muted based on a peak energy detected during the azimuth sweep, the peak energy corresponding to the interference.

13. The method according to claim 11, wherein the interference corresponds to an aviation surveillance frequency.

14. The method according to claim 11, wherein the plurality of signals include cell-specific reference signals.

15. The method according to claim 11, wherein the plurality of signals include synchronization signals.

16. One or more non-transitory computer storage media having computer-executable instructions embodied thereon, that when executed by at least one processor, cause the at least one processor to perform a method comprising:

transmitting, via at least one antenna array of a terrestrial base station during a listening mode, a plurality of signals along a plurality of beams of a coverage area;

detecting based on one or more user equipment (UE) observations of noise with respect to the plurality of signals, an interference above a predetermined threshold, the interference corresponding to a satellite earth station;

determining an angle of arrival corresponding to the satellite earth station based on the detected interference; and muting the at least one a beam of the at least one antenna array that corresponds to the angle of arrival.

17. The one or more non-transitory computer storage media of claim 16, wherein the at least one antenna array is in the listening mode for a special subframe time period.

18. The one or more non-transitory computer storage media of claim 16, wherein the plurality of signals are transmitted via an azimuth sweep from −90 to +90 degrees.

* * * * *